US010329370B2

(12) United States Patent
Prissok et al.

(10) Patent No.: US 10,329,370 B2
(45) Date of Patent: Jun. 25, 2019

(54) ISOCYANATE-EPOXIDE HYBRID RESINS

(71) Applicant: BASF SE, Ludwigshafen (DE)

(72) Inventors: Frank Prissok, Lemfoerde (DE); Andre Kamm, Bohmte (DE)

(73) Assignee: BASF SE, Ludwigshafen (DE)

( * ) Notice: Subject to any disclaimer, the term of this patent is extended or adjusted under 35 U.S.C. 154(b) by 130 days.

(21) Appl. No.: 14/890,847

(22) PCT Filed: May 8, 2014

(86) PCT No.: PCT/EP2014/059424
§ 371 (c)(1),
(2) Date: Nov. 12, 2015

(87) PCT Pub. No.: WO2014/184082
PCT Pub. Date: Nov. 20, 2014

(65) Prior Publication Data
US 2016/0090436 A1 Mar. 31, 2016

(30) Foreign Application Priority Data

May 13, 2013 (EP) ..................................... 13167490

(51) Int. Cl.
C08G 18/00 (2006.01)
C08G 18/10 (2006.01)
C08G 18/20 (2006.01)
C09D 175/04 (2006.01)

(52) U.S. Cl.
CPC ............ C08G 18/003 (2013.01); C08G 18/10 (2013.01); C08G 18/2063 (2013.01); C09D 175/04 (2013.01); C08G 2190/00 (2013.01)

(58) Field of Classification Search
CPC .. C08G 18/003; C08G 18/10; C08G 18/2063; C08G 2190/00; C09D 175/04
See application file for complete search history.

(56) References Cited

U.S. PATENT DOCUMENTS

| | | |
|---|---|---|
| 4,564,651 A | 1/1986 | Markert et al. |
| 4,699,931 A | 10/1987 | Fuzesi et al. |
| 6,432,541 B1 * | 8/2002 | Gan ...................... C08G 18/003 156/307.3 |
| 2010/0237292 A1 | 9/2010 | Gan et al. |
| 2012/0245252 A1 | 9/2012 | Gan et al. |
| 2016/0159999 A1 * | 6/2016 | Prissok .............. C08G 18/4829 521/90 |

FOREIGN PATENT DOCUMENTS

| | | |
|---|---|---|
| CA | 2 030 599 A1 | 6/1991 |
| CN | 101815734 A | 8/2010 |
| CN | 102712739 A | 10/2012 |
| DE | 26 01 927 A1 | 7/1976 |
| DE | CE 2601927 * | 7/1976 |
| DE | 36 00 764 A1 | 7/1987 |
| EP | 0 130 454 A2 | 1/1985 |
| EP | 0 435 060 A2 | 7/1991 |
| WO | 2011/095440 A1 | 8/2011 |

OTHER PUBLICATIONS

Machine English translation of DE 2601927, Toshikazu et al., Jul. 1976.*
"Polyurethane" Kunststoff-Handbuch, Band 7, Carl Hanser Verlag, Edited by Günter Oertel, 3rd edition, 1993, Section 3.1, pp. 57-75 and Cover Page.
"Polyurethane" Kunststoff-Handbuch, Band VII, Edited by Richard Vieweg and August Höchtlen, Carl Hanser Verlag, 1966 pp. 103-113 and Cover Page.
International Search Report dated Jul. 21, 2014 in PCT/EP14/059424 Filed May 8, 2014.
Combined Office Action and Search Report dated Apr. 1, 2017 in Chinese Patent Application No. 201480039830.3 (with English translation of categories of cited documents).

* cited by examiner

*Primary Examiner* — Patrick D Niland
(74) *Attorney, Agent, or Firm* — Oblon, McClelland, Maier & Neustadt, L.L.P.

(57) ABSTRACT

The present invention relates to a method for producing at least one resin, which comprises mixing at least one polyisocyanate with at least one polyepoxide, the reaction taking place in the presence of a catalyst system based on at least one metal-free Lewis base having at least one nitrogen atom, and also to resins obtainable by a method of the invention, and to the use of a resin obtainable by a method of the invention, or of a resin of the invention, for producing seals, for producing components for rotor blades, boat hulls, or vehicle body parts, or for coatings.

14 Claims, No Drawings

ISOCYANATE-EPOXIDE HYBRID RESINS

The present invention relates to a method for producing at least one resin, which comprises mixing at least one polyisocyanate with at least one polyepoxide, the reaction taking place in the presence of a catalyst system based on at least one metal-free Lewis base having at least one nitrogen atom, and also to resins obtainable by a method of the invention, and to the use of a resin obtainable by a method of the invention, or of a resin of the invention, for producing seals, for producing components for rotor blades, boat hulls, or vehicle body parts, or for coatings.

Resin systems based on isocyanates have long been known and are often used in industry. A great disadvantage of these resin systems based on isocyanates, relative to epoxy resins or polyester resins, is the fact that the working time of known polyurethane systems is about 45 minutes at most and is therefore too short for the filling of components of large surface area. Even with or without catalyst systems customarily used in polyurethane systems, especially mercury catalysts, as are disclosed in WO 2011/095440 A1, for example, the working times attained are insufficient for such applications.

In the case of casting systems, in particular, a resin system must first of all be able to be delivered into a mold, which often has a geometrically demanding configuration, in a very low-viscosity state; subsequently, however, the system is to cure rapidly, so that demolding or quick availability for use is provided. This characteristic is described in the case of casting systems by what is called the 'open time', the time within which working after mixing is still possible, the 'demolding time', after which a molding can be taken from a mold, and the so called 'setting time', the time after which the system has undergone full reaction right through. Optimizing these times imposes exacting requirements on the catalyst system employed.

A series of patents have addressed the production, processing, and utilization of combinations of isocyanates and epoxides. For industrial applications, the use of this class of substance is difficult, since simple mixtures of isocyanates and epoxides are very hard to react, even at elevated temperatures. The literature teaches that oxazolidones can be formed at higher temperatures, more particularly at temperatures above 120° C., after a relatively long time. A competing reaction is the formation of polyisocyanurates (PIR) from the isocyanates.

Accordingly, U.S. Pat. No. 4,699,931 describes a process for producing oxazolidone-modified polyisocyanurate foams, in which polyepoxides and polyisocyanates react with aminic PIR catalysts and blowing agents in order to produce corresponding foams. The disclosure of U.S. Pat. No. 4,699,931 is that the reaction proceeds extremely rapidly, with a starting time of less than 20 seconds, for example.

EP 0 130 454 A2 discloses a method for producing compact reactive resins based on isocyanates and epoxides. EP 0 130 454 A2 further teaches the use of amine catalysts as resulting in short pot lives even at low temperatures. A disadvantage possessed by the resin system disclosed in EP 0 130 454 A2 is that they have to be cured at high temperatures.

DE 36 00 764 A1 describes the use of tertiary or quaternary ammonium salts as catalysts for obtaining systems with a long open time. A disadvantage associated with the method disclosed in DE 36 00 764 A1 is that the curing takes place at high temperatures. DE 36 00 764 A1 further discloses the ability to achieve an open time only of less than 20 minutes by means of tertiary amines. For relatively large components and industrial applications, these times and working conditions are insufficient.

Proceeding on the basis of the prior art, therefore, it was an object of the present invention to provide methods for producing resins based on isocyanates and epoxides that are suitable for technical applications, and suitable resin systems. The working time ought to be sufficiently long, and the resin systems ought to cure rapidly and effectively under suitable conditions at the same time. The reaction conditions of the method ought, moreover, to permit technical application.

In accordance with the invention this object is achieved by a method for producing a resin, which comprises mixing at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof.

Surprisingly it has now been found that by using a catalyst system based on at least one metal-free Lewis base having at least one nitrogen atom, selected from the group consisting of 1,8-diazabicyclo-5,4,0-undecen-7-ene and derivatives thereof, the reaction can be controlled temperature-dependently in the mixing of isocyanates and epoxides. The method of the invention therefore permits a long open time of the resin system, and rapid curing in the case of corresponding temperature treatment.

With the method of the invention and with the inventive combination of the catalyst system with the corresponding polyisocyanates and polyepoxides, the open time of the resin system is readily adjustable, allowing the components to be mixed and then resulting initially in a low-viscosity mixture, which can be worked over a long time. This mixture can then be delivered, and a reaction begins only on appropriate temperature treatment or with a correspondingly large amount of catalyst.

In accordance with the invention, the catalyst system is used preferably in an amount of 0.001 to 1 wt %, based on the sum of the polyisocyanate and polyepoxide used. The catalyst system is used preferably in an amount of 0.005 to 0.75 wt %, based on the sum of the polyisocyanate and polyepoxide used, and more preferably in an amount of 0.01 to 0.5 wt %, based on the sum of the polyisocyanate and polyepoxide used.

In a further embodiment, accordingly, the present invention relates to a method for producing a resin as described above, the catalyst system being used in an amount of 0.001 to 1 wt %, based on the sum of the polyisocyanate and polyepoxide used.

In a further embodiment, the present invention further relates to a method for producing a resin as described above, the method comprising at least the following steps:
 (i) mixing the at least one polyisocyanate, the at least one polyepoxide, and the catalyst system to obtain a mixture (I);
 (ii) delivering the mixture (I) into a mold or to the desired reaction site by pouring, spraying, or distributing;
 (iii) heating the mixture (I) to a temperature in the range from 70 to 100° C. until the mixture is cured.

In accordance with the invention, the mixture (I) comprising the at least one polyisocyanate, the at least one polyepoxide, and the catalyst system is of low viscosity and preferably possesses a gel time of more than 45 minutes at a temperature of 25° C., more particularly more than 60 minutes, more preferably more than 90 minutes, very preferably more than 180 minutes, and especially preferably more than 240 minutes.

The gel time here is defined in the context of the present invention as the reaction at room temperature of a mixture of 100 grams of polyisocyanate, polyepoxide, and catalyst to form a solid material. The gel time of this mixture is determined using a model 100 Shyodu Gel Timer.

In one preferred embodiment of the invention, the viscosity of the mixture (I) at 25° C. changes hardly in a period of 45 minutes, more particularly 60 minutes, preferably 90 minutes, more preferably 180 minutes, and very preferably 240 minutes, and the material possesses excellent flowability. In this preferred embodiment of the invention, the viscosity in this period does not rise more than 200%, preferably not more than 100%, and more preferably not more than 50% of the initial viscosity.

Besides the at least one polyisocyanate, the at least one polyepoxide, and the catalyst system, the mixture (I) may comprise further components, examples being solvents, reactive diluents, stabilizers, defoamers, thickeners, thixotropic agents, additives, adhesion promoters, fillers, water scavengers, polyols, or polyamines.

According to a preferred embodiment, therefore, the present invention relates to a method for producing a resin as described above, the mixture (I) having a gel time of more than 60 minutes at a temperature of 25° C.

In step (ii), the resulting mixture (I) is delivered. For the purposes of the present invention, delivery may take place in any suitable way, particularly by pouring, spraying, or distributing. Suitable techniques are known per se to the skilled person.

Then, according to step (iii), there is a temperature treatment. In accordance with the invention the mixture of the at least one polyisocyanate, the at least one polyepoxide, and the catalyst system is preferably unreactive at a temperature of 25° C. In accordance with the invention, curing takes place only on heating, preferably on heating to a temperature of less than 100° C., more preferably on heating to a temperature in the range from 70 to 100° C.

The present invention accordingly relates, in a further embodiment, to a method for producing a resin as described above, the reaction stating at a temperature of less than 100° C.

In accordance with the invention, the heating takes place until the mixture cures. Curing of the mixture in this context means the attainment of at least 20%, preferably 50%, and more preferably 75% of the final hardness. Curing may also be understood as the time taken to reach a "tack-free" state.

Heating may take place in any suitable way known to the skilled person—preferably by electrical heating, oil or water, heating of the mold, induction arrays, hot air, or IR radiation onto the resin surface.

The method of the invention uses a catalyst system based on at least one metal-free Lewis base having at least one nitrogen atom, selected from the group consisting of 1,8-diazabicyclo-5,4,0-undecen-7-ene and derivatives thereof. In accordance with the invention, the catalyst per se is not reacted.

The catalyst system preferably is a metal-free catalyst system—in other words, no metal-containing catalyst is used. Accordingly, in a further embodiment, the present invention relates to a method for producing a resin as described above, the catalyst system being a metal-free catalyst system.

In accordance with the invention, the catalyst system is preferably selected such that the working time of the resin system at 25° C. can be set to longer than 45 minutes, more particularly longer than 60 minutes, preferably to longer than 90 minutes, more preferably longer than 180 minutes, and very preferably longer than 240 minutes.

In accordance with the invention, a catalyst system is used which is based on at least one metal-free Lewis base having at least one nitrogen atom. This system, for the purposes of the present invention, comprises at least 1,8-diazabicyclo-5,4,0-undecen-7-ene and derivatives thereof.

With particular advantage the metal-free Lewis base is a derivative of 1,8-diazabicyclo-5,4,0-undecen-7-ene, more preferably a blocked 1,8-diazabicyclo-5,4,0-undecen-7-ene, more preferably still a phenol-blocked 1,8-diazabicyclo-5,4,0-undecen-7-ene. For example, the metal-free Lewis base is a derivative of 1,8-diazabicyclo-5,4,0-undecen-7-ene or mixtures of 1,8-diazabicyclo-5,4,0-undecen-7-ene with acidic components, such as phenol or acids, for example. Products of this kind are marketed under a variety of trade names, such as, for example, Polycat SA 1/10, Toyocat DB 30, Toyocat DB 41, Toyocat DB 42, or Toyocat DB 60. Particular preference is given to using 1,8-diazabicyclo-5,4,0-undecen-7-ene or a phenol-blocked 1,8-diazabicyclo-5,4,0-undecen-7-ene.

In a further embodiment of the invention, it may be advantageous to add further tertiary amines as catalyst alongside the 1,8-diazacyclo-5,4,0-undecen-7-ene of the invention. In that case the 1,8-diazacyclo-5,4,0-undecen-7-ene of the invention is present in excess. Preferred ratios of 1,8-diazacyclo-5,4,0-undecen-7-ene to other tertiary amines are 51:49, preferably 75:25, more preferably of 90:10, very preferably 95:5, and more particularly 99:1.

The polyepoxides which are used for the purpose of the present invention may be any desired compounds. These polyepoxides comprise at least one epoxide group, but preferably two or more epoxide groups. Suitable polyepoxides are known to the skilled person from the literature, such as from the Handbook of Epoxy Resins (H. Lee, K. Neville, McGraw-Hill Book Company), for example. Examples that may be given of monofunctional epoxides are isopropyl glycidyl ether, tert-butyl glycidyl ether or ethylhexyl glycidyl ether, for example. Having proven particularly suitable for the method of the invention are epoxides based on epichlorohydrin and bisphenol A, bisphenol F, bisphenol K, bisphenol S, biphenol, hydroquinone, resorcinol, tetrabromobisphenol A, phenol-formaldehyde novolac resins, polyglycidyl ethers, diglycidyl esters of, for example, phthalic acids or terephthalic acids, and derivatives thereof, and aliphatic di- or tri-epoxides, and mixtures thereof. Products of this kind are marketed by a variety of manufacturers, under the trade names Araldite©, D.E.R.©, Epilox©, or Baxxores©. Particularly preferred are bisphenol A epoxides and derivatives thereof, especially glycidyl ethers, such as diglycidyl ether of bisphenol A, for example, and mixtures with the above-stated aliphatic di- or tri-epoxides.

In a further embodiment, accordingly, the present invention relates to a method for producing a resin as described above, the at least one polyepoxide being selected from the group consisting of bisphenol A epoxides, bisphenol F epoxides, derivatives thereof, aliphatic di- or tri-epoxides, and mixtures of two or more thereof.

In accordance with the invention it is also possible to use mixtures of different polyepoxides.

Accordingly, in one further embodiment, the present invention relates to a method for producing a resin as described above, there being no isocyanate-reactive compounds other than epoxides used in the reaction of the at least one polyisocyanate with the at least one polyepoxide.

In accordance with the invention, the polyepoxide can be used in pure form or in the form of a composition comprising the polyepoxide and at least one diluent. Examples of suitable diluents known to the skilled person are unreactive solvents such as ethyl acetate, methyl ethyl ketone, hydrocarbons, reactive diluents such as linear di- or tri-epoxides of low viscosity, plasticizers such as phthalates, or citric esters. The following ought also to be understood as diluents for the purposes of this invention: low-viscosity reactive diluents such as, for example, monoglycidyl ethers or diglycidyl ethers based on short-chain diols or triols, such as 1,4-butanediol, 1,6-hexanediol, trimethylolpropane, 1,4-cyclohexanedimethanol, or polyoxypropylene glycol, for example.

As polyisocyanates it is possible to use aliphatic, cycloaliphatic, araliphatic and/or aromatic diisocyanates. Specific examples include the following aromatic isocyanates: 2,4-tolylene diisocyanate, mixtures of 2,4- and 2,6-tolylene diisocyanate, 4,4'-, 2,4'- and/or 2,2'-diphenylmethane diisocyanate (MDI), mixtures of 2,4'- and 4,4'-diphenylmethane diisocyanate, urethane-modified liquid 4,4'- and/or 2,4-diphenylmethane diisocyanates, 4,4'-diisocyanatodiphenylethane, the mixtures of monomeric methanediphenyl diisocyanates and more highly polycyclic homologues of methanediphenyl diisocyanate (polymeric MDI), 1,2-and 1,5-naphthylene diisocyanate.

Aliphatic diisocyanates used are customarily aliphatic and/or cycloaliphatic diisocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/ or -2,6-cyclohexane diisocyanate, 4,4'-, 2,4'- and/or 2,2'-dicyclohexylmethane diisocyanate.

Polyisocyanate prepolymers are obtainable by reacting above-described polyisocyanates in excess, at temperatures of 30 to 100° C., for example, preferably at about 80° C., with polyols to give the prepolymer. For the preparation of the prepolymers of the invention, preference is given to using polyisocyanates and commercial polyols based on polyesters, starting for example from adipic acid, or on polyethers, starting for example from ethylene oxide and/or propylene oxide.

Polyols are known to the skilled person and are described for example in "Kunststoffhandbuch, volume 7, Polyurethane", Carl Hanser Verlag, 3rd edition 1993, section 3.1. Polyols used with preference in this context are the polymeric compounds described under b), having hydrogen atoms that are reactive toward isocyanates. Particularly preferred for use as polyols are polyetherols.

In the preparation of the isocyanate prepolymers, customary chain extenders or crosslinking agents are added optionally to the stated polyols. Such substances are described under c) hereinafter. Particularly preferred for use as chain extender is 1,4-butanediol, dipropylene glycol and/or tripropylene glycol. In this case the ratio of organic polyisocyanates to polyols and chain extenders is preferably selected such that the isocyanate prepolymer has an NCO content of 2% to 30%, preferably of 6% to 28%, more preferably of 10% to 24%.

Particularly preferred polyisocyanates are selected from the group consisting of MDI, polymeric MDI, and TDI, and also derivatives thereof or prepolymers of these polyisocyanates.

In a further embodiment, accordingly, the present invention relates to a method for producing a resin as described above, the at least one polyisocyanate being selected from the group consisting of aromatic, araliphatic, and aliphatic polyisocyanates.

In accordance with the invention, the polyisocyanate can be used in pure form or in the form of a composition, for example, an isocyanate prepolymer. In a further embodiment, a mixture can be used which comprises polyisocyanate and at least one solvent. Suitable solvents are known to the skilled person.

The mixtures of polyisocyanates and polyepoxides ought preferably to consist of an equivalents ratio of polyisocyanate to polyepoxide from polyisocyanates of preferably 0.25:1 to 5000:1, more preferably 0.35:1 to 500:1, very preferably 0.5:1 to 100:1, and more particularly 0.75:1 to 50:1.

In accordance with the invention it is possible to add customary auxiliaries. Examples that may be mentioned include surface-active substances, fillers, further flame retardants, nucleators, oxidation stabilizers, lubricity aids and mold release aids, dyes and pigments, optionally stabilizers, with respect to hydrolysis, light, heat, or discoloration, for example, inorganic and/or organic fillers, reinforcing agents, and plasticizers. Suitable auxiliaries and adjuvants may be found, for example, in Kunststoffhandbuch, volume VII, edited by Vieweg and Höchtlen, Carl Hanser Verlag, Munich 1966 (pp. 103-113).

Surprisingly it has been found that humid storage of the cured resin leads to a further improvement in the mechanical properties. This effect is observed particularly at equivalents ratios of polyisocyanates to polyepoxides of 0.25:1 to 4:1, preferably 0.25:1 to 3:1, more preferably 0.25:1 to 2:1. This effect may be achieved in a water vapor atmosphere even on relatively short storage. On storage in water (saltwater, mains water, desalinated water) as well this effect can be observed at elevated temperatures (>50° C.).

If alteration to the final component properties is unwanted, or if aging under hot and humid conditions is not possible, it is preferred to operate with an equivalents ratio of polyisocyanates to polyepoxides of greater than 5:1, preferably greater than 7.5:1, and more preferably greater than 10:1.

In accordance with a further embodiment, then, the present invention relates to a method for producing a resin as described above, the fully reacted resin obtained in the reaction being stored under humid conditions after the reaction.

The present invention also relates to the use of a metal-free Lewis base having at least one nitrogen atom as catalyst for the mixing of at least one polyisocyanate with at least one polyepoxide. More particularly the present invention relates to the use of 1,8-diazabicyclo-5,4,0-undecen-7-ene and derivatives thereof as catalyst for the reaction of at least one polyisocyanate with at least one polyepoxide, more preferably to the use of 1,8-diazabicyclo-5,4,0-undecen-7-ene and derivatives thereof as catalyst for the reaction of bisphenol A epoxides and derivatives thereof with at least one polyisocyanate.

The present invention further relates as well to resins obtainable by a method of the invention and also to moldings obtainable from such resins.

In accordance with a further aspect, then, the present invention relates to a resin obtainable by reacting at least one polyisocyanate with at least one polyepoxide, the reaction taking place in the presence of a catalyst system based on at least one metal-free Lewis base having at least one nitrogen atom as described above.

More particularly, in a further embodiment, the present invention relates to a resin as described above, the reaction taking place in the presence of a catalyst system based on at least one metal-free Lewis base having at least one nitrogen atom as described above, and the method comprising at least the following steps:
(i) mixing the at least one polyisocyanate, the at least one polyepoxide, and the catalyst system to obtain a mixture (I);
(ii) delivering the mixture (I) into a mold or to the desired reaction site by pouring, spraying, or distributing;
(iii) heating the mixture (I) to a temperature in the range from 70 to 100° C. until the mixture is cured.

Suitable polyepoxides, polyisocyanates, and catalyst system have been described above.

Thus, in a further embodiment, the present invention relates to a resin as described above, the at least one polyepoxide being selected from the group consisting of bisphenol A epoxides, derivatives thereof, and aliphatic di- or tri-epoxides.

Preferably, in a further embodiment, the present invention relates to a resin as described above, with at least one polyisocyanate being selected from the group consisting of aromatic, araliphatic, and aliphatic polyisocyanates.

Polyisocyanates used with preference are prepolymers. By varying the isocyanate fraction in the prepolymer it is possible to adjust additional properties such as hardness, for example, if no further adjuvants are used such as plasticizers, for example.

The field of use contemplated for the resins of the invention includes in particular—in addition to the customary polyurethane resin applications such as coatings, laminating, seals, and production of moldings—applications in which components of very high surface area are being produced, such as rotor blades for wind turbines, boat hulls, or plastic vehicle bodies for automobiles. Processing methods employed here in particular are vacuum infusion and pressure infusion.

Further conceivable applications are in the area of automobile, architectural preservation, concrete coating, district heating, mechanical engineering, and maritime applications. According to a further aspect, the present invention also relates to the use of a resin obtainable by a method of the invention as described above, or of a resin of the invention as described above, for producing seals, for producing components for rotor blades, boat hulls, or vehicle body parts, or for coatings.

Further embodiments of the present invention are apparent from the claims and the examples. It is understood that the features of the subject matter/method/uses of the invention, as elucidated below and as stated above, can be used not only in the particular combination specified but also in other combinations as well, without departing the scope of the invention. Accordingly, for example, the combination of a preferred feature with a more preferred feature, or of an otherwise uncharacterized feature with a very preferred feature, etc., is implicitly comprised, even if that combination is not expressly mentioned.

Listed below are exemplary embodiments of the present invention, which do not restrict the present invention. In particular, the present invention also encompasses embodiments which arise from the dependency references stated below, and hence combinations.

1. A method for producing a resin, which comprises mixing at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof.
2. The method according to embodiment 1, the catalyst system being used in an amount of 0.001 to 1 wt %, based on the sum of the polyisocyanate and polyepoxide used.
3. The method according to embodiment 1 or 2, the method comprising at least the following steps:
(i) mixing the at least one polyisocyanate, the at least one polyepoxide, and the catalyst system to obtain a mixture (I);
(ii) delivering the mixture (I) into a mold or to the desired reaction site by pouring, spraying, or distributing;
(iii) heating the mixture (I) to a temperature in the range from 70 to 100° C. until the mixture is cured.
4. The method according to embodiment 3, the mixture (I) having a gel time of more than 60 minutes at a temperature of 25° C.
5. The method according to any of embodiments 1 to 4, the at least one polyepoxide being selected from the group consisting of bisphenol A epoxides, bisphenol F epoxides, derivatives thereof, aliphatic di- or tri-epoxides, and mixtures of two or more thereof.
6. The method according to any of embodiments 1 to 5, there being no isocyanate-reactive compounds other than epoxides used in the reaction of the at least one polyisocyanate with the at least one polyepoxide.
7. The method according to any of embodiments 1 to 6, the at least one polyisocyanate being selected from the group consisting of aromatic, araliphatic, and aliphatic polyisocyanates.
8. The method according to any of embodiments 1 to 7, the at least one polyisocyanate being a prepolymer having an NCO content of 2% to 30%, preferably of 6% to 28%, and more preferably of 10% to 24%.
9. The method according to any of embodiments 1 to 8, the equivalents ratio of the at least one polyisocyanate to the at least one polyepoxide being in the range from 0.25:1 to 5000:1.
10. The method according to any of embodiments 1 to 9, there being no hydrogen-acidic compounds added in the reaction of the at least one polyisocyanate with the at least one polyepoxide.
11. A resin obtainable or obtained by the mixing of at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof.
12. The resin according to embodiment 11, the catalyst system being used in an amount of 0.01 to 1 wt %, based on the sum of the polyisocyanate and polyepoxide used.
13. The resin according to embodiment 11 or 12, the at least one polyepoxide being selected from the group consisting of bisphenol A epoxides, bisphenol F epoxides, derivatives thereof, aliphatic di- or tri-epoxides, and mixtures of two or more thereof.
14. The resin according to any of embodiments 11 to 13, the at least one polyisocyanate being selected from the group consisting of aromatic, araliphatic, and aliphatic polyisocyanates.

15. The use of a resin obtainable by a method according to any of embodiments 1 to 10 or of a resin according to any of embodiments 11 to 14 for producing seals, for producing components for rotor blades, boat hulls, or vehicle body parts, or for coatings.
16. A method for producing a resin, which comprises mixing at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof, and
    the catalyst system being used in an amount of 0.01 to 1 wt %, based on the sum of the polyisocyanate and polyepoxide used.
17. A method for producing a resin, which comprises mixing at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof, and the method comprising at least the following steps:
    (i) mixing the at least one polyisocyanate, the at least one polyepoxide, and the catalyst system to obtain a mixture (I);
    (ii) delivering the mixture (I) into a mold or to the desired reaction site by pouring, spraying, or distributing;
    (iii) heating the mixture (I) to a temperature in the range from 70 to 100° C. until the mixture is cured.
18. A method for producing a resin, which comprises mixing at least one polyisocyanate with at least one polyepoxide, said mixing taking place in the presence of a catalyst system based on at least one metal-free Lewis base having at least one nitrogen atom, selected from the group consisting of 1,8-diazabicyclo-5,4,0-undecen-7-ene and derivatives thereof, the catalyst system being used in an amount of 0.01 to 1 wt %, based on the sum of the polyisocyanate and polyepoxide used, and the method comprising at least the following steps:
    (i) mixing the at least one polyisocyanate, the at least one polyepoxide, and the catalyst system to obtain a mixture (I);
    (ii) delivering the mixture (I) into a mold or to the desired reaction site by pouring, spraying, or distributing;
    (iii) heating the mixture (I) to a temperature in the range from 70 to 100° C. until the mixture is cured.

The examples which follow are for illustration of the invention, but are not in any way restricting as regards the subject matter of the present invention.

EXAMPLES

Starting materials used were as follows:
ISO 1: Lupranat® M 20 from BASF Polyurethanes GmbH, Polymeric MDI having an NCO content of 31.5%
ISO 2: Prepolymer ISO 137/28 from BASF Polyurethanes GmbH, based on 4,4'-MDI, carbodiimide-modified MDI, and polypropylene glyene glycol, having an NCO content of 18%
ISO 3: Lupranat® MP 102 from BASF Polyurethanes GmbH, prepolymer based on 4,4'-MDI, having an NCO content of 22.9%
ISO 4: Prepolymer ISO 136/144 from BASF Polyurethanes GmbH, having an NCO content of 10%
Epoxide: Baxxores® ER 5400 from BASF, epoxide mixture based on bisphenol A epoxides and reactive diluents, having an EEW of 172 g/eq
Cat 1: Triethylenediamine, in 33% strength solution in propylene glycol
Cat 2: 1,8-Diazabicyclo-5,4,0-undec-7-ene (DBU)
Cat 3: Polycat® 9 from Airproducts (bis(3-dimethylamino-propyl)-n,n-dimethylpropanediamine)
Cat 4: N-(3-(Dimethylamino)propyl)-N,N',N'-trimethylpropane-1,3-diamine
Cat 5: Thorcat 535
Cat 6: Addocat® PP from Rhein Chemie
Cat 7: Phenol blocked 1,8-diazabicyclo-5,4,0-undec-7-ene
WM: Citrofol® B1 plasticizer from Jungbunzlauer
1. Examples C1 to C8 and I1 and I2

First of all a mixture of polyepoxide and catalyst was prepared and then the isocyanate component was added and mixing carried out again. The temperature of all of the components was 25° C. The composition of the components can be found in table 1. The open time was determined using a Shyodu gel timer at room temperature. If the material had still not solidified after 60 minutes, the determination of the open time by Shyodu gel timer was discontinued and the curing was assessed visually. If the material was still flowable, the gel point had not yet been reached. In parallel, the corresponding mixtures were heated/cured at 80° C. for 60 minutes in order to see whether the materials solidify. The examples coded C are comparative examples.

TABLE 1

|  | C1 | C2 | C3 | C4 | C5 | C6 | C7* | C8 | I1 | I2 |
|---|---|---|---|---|---|---|---|---|---|---|
| Epoxide | 99.85 g | 99.85 g | 99.85 g | 99.85 g | 99.85 g | 99.85 g |  | 99.85 g | 99.85 g | 99.85 g |
| ISO 1 | 77.4 g | 77.4 g | 77.4 g | 77.4 g | 77.4 g |  | 77.4 g | 77.4 g | 77.4 g | 77.4 g |
| Cat 1 | 0.15 g |  |  |  |  |  |  |  |  |  |
| Cat 2 |  |  |  |  |  | 0.15 g | 0.15 g |  | 0.15 g |  |
| Cat 3 |  | 0.15 g |  |  |  |  |  |  |  |  |
| Cat 4 |  |  | 0.15 g |  |  |  |  |  |  |  |
| Cat 5 |  |  |  | 0.15 g |  |  |  |  |  |  |
| Cat 6 |  |  |  |  | 0.15 g |  |  |  |  |  |
| Cat 7 |  |  |  |  |  |  |  |  |  | 0.15 g |
| Open time at RT | 5 min (solid) | 15 min (solid) | 12 min (solid) | >24 h (liquid) | 25 min (solid) | >24 h (liquid) | >24 h (liquid) | >24 h (liquid) | >24 h (liquid) | >24 h (liquid) |
| Appearance after 60 min at 80° C. | Solid | Solid | Solid | Liquid | Solid | Liquid | Liquid | Liquid | Solid | Solid |

*Catalyst is incompatible with isocyanate component, the mixture clouds and a precipitate is formed Surprisingly it has been found that mixtures of epoxides and isocyanates in combination with 1,8-diazabicyclo-5,4,0-undec-7-ene remain liquid at room temperature for an extremely long time and then react rapidly at a moderate temperature to form a solid material. Other amine catalysts show the typical behavior known from the prior art. The experiments also show that such behavior cannot be obtained with metal catalysts. The use of metal catalysts such as Thorcat 535 does not result in curing of the mixture of epoxide and isocyanate.

2. Examples C9 to C10 and I3 to I9

Since the ratio of polyisocyanate and polyepoxide in combination with a specific concentration of 1,8-diazabicyclo-5,4,0-undec-7-ene is essential to the invention, this circumstance is illustrated with the experiments below. In this case, the open time at room temperature was determined visually. The limiting value aimed for in these experiments was an open time of greater than 120 minutes at room temperature, and the test was discontinued when the time was reached. In parallel, the corresponding mixtures were reacted in an oven at 90° C. for 120 minutes. As in the preceding experiments, polyepoxide was first of all premixed with catalyst 2. Portions of this mixture were then mixed with the polyisocyanate. Table 2 shows the quantitative fractions of the reaction mixtures, the fraction of catalyst, based on the mixture of polyepoxides, polyisocyanates, and catalyst, and the equivalents ratio of polyisocyanate to polyepoxide.

TABLE 2

|  | C9 | C10 | I3 | I4 | I5 | I6 | I7 | I8 | I9 |
|---|---|---|---|---|---|---|---|---|---|
| Epoxide | 95 g | 49.375 g | 50.3 g | 49.7 g | 4.9375 g | 1.08625 g | 0.49 g | 0.147 g | 79.0 g |
| Cat 2 | 5 g | 0.625 g | 0.1 g | 0.3 g | 0.0625 g | 0.01375 g | 0.01 g | 0.003 g | 1.0 g |
| ISO 3 | 25 g | 10 g | 12.4 g | 29.6 g | 49.2 g | 49.6 g | 49.5 g | 49.5 g |  |
| ISO 4 |  |  |  |  |  |  |  |  | 200 g |
| %-cat | 4 | 1.04 | 0.16 | 0.38 | 0.11 | 0.027 | 0.02 | 0.006 | 0.36 |
| VH | 0.25:1 | 0.19:1 | 0.23:1 | 0.56:1 | 9.33:1 | 42.77:1 | 94.52:1 | 315:1 | 1:1 |
| Open time at RT | <1 min (solid) | 30 min (solid) | >120 minutes (liquid) | >120 minutes (liquid) | >120 minutes (liquid) | >120 minutes (liquid) | >120 minutes (liquid) | >120 minutes (liquid) | >120 minutes (liquid) |
| Appearance after 120 min at 90° C. | Solid | Solid | Solid | Solid | Solid | Solid | Solid | Solid | Solid |

%-cat denotes the fraction of catalyst, based on the mixture of catalyst, polyisocyanate, and polyepoxide;
VH describes the equivalents ratio of isocyanate:epoxide in the mixture of polyisocyanate and polyepoxide.

3. Examples C11 and I10

Since C7 showed that pure DBU exhibits incompatibility with the polyisocyanate, the intention in the experiments below is to show that the inventive mixture of polyisocyanate, polyepoxide, and catalyst is necessary for curing, and the combination of DBU and polyisocyanate does not lead to the desired outcome.

For this purpose, a mixture was prepared from 1 g of DBU in 49 g of epoxide and, respectively, 1 g of DBU in 49 g of Citrofol B1 plasticizer. 1 g of each of these mixtures was then mixed with 49 g of Iso 3, and the open time and curing were carried out in analogy to the preceding experiments. The table presents information about the outcomes. The mixture from C11 was clear and no precipitate was observable.

TABLE 3

|  | C11 | I10 |
|---|---|---|
| Epoxide |  | 0.98 g |
| WM | 0.98 g |  |
| Cat 2 | 0.02 g | 0.02 g |

TABLE 3-continued

|  | C11 | I10 |
|---|---|---|
| ISO 3 | 49.0 g | 49.0 g |
| %-cat | 0.04 | 0.04 |
| VH | — | 46.8:1 |
| Open time at RT | >120 minutes (liquid) | >120 minutes (liquid) |
| Appearance after 120 min at 90° C. | Liquid | Solid |

4. Examples I11 and I12

In order to show that the inventive mixtures of polyisocyanate, polyepoxide, and catalyst also have outstanding mechanical properties, experiments I11 and I12 were carried out. For this purpose, the components were mixed and degassed (using a vacuum Speedmixer). Test plaques with a thickness of 2 mm were produced from the resulting mixture. Curing took place at 95° C. for 2 hours. The materials were thereafter stored under standard conditions for 7 days, after which the mechanical properties were ascertained. Aging under hot and humid conditions was carried out in a pressure vessel at 130° C. in a water vapor atmosphere for 5, 10, or 15 hours. After these times, the specimens were removed, dried, and conditioned under standard conditions for 24 hours before the mechanical properties were ascertained.

Table 4 provides information about mechanical properties before and after aging.

TABLE 4

|  | I11 | I12 |
|---|---|---|
| Epoxide | 99.7 g | 99.7 g |
| Cat 2 | 0.3 g | 0.3 g |
| ISO 2 | 135.4 g | 270.8 g |
| Mechanical properties Original |  |  |
| Tensile strength [Mpa] | 17.4 | 30.1 |
| Elongation @ break [%] | 26 | 13 |
| Elasticity modulus [MPa] | 266 | 913.6 |
| Hydrolysis 5 h @ 130° C. |  |  |
| Tensile strength [Mpa] | 41.6 | 41.4 |
| Elongation @ break [%] | 7 | 10 |
| Elasticity modulus [MPa] | 1211 | 1055 |

TABLE 4-continued

|  | I11 | I12 |
|---|---|---|
| 10 h @ 130° C. | | |
| Tensile strength [Mpa] | 46.6 | 41.7 |
| Elongation @ break [%] | 8 | 8 |
| Elasticity modulus [MPa] | 1425 | 1012 |
| 15 h @ 130° C. | | |
| Tensile strength [Mpa] | 49.1 | 42.6 |
| Elongation @ break [%] | 11 | 8 |
| Elasticity modulus [MPa] | 1405 | 870 |

As is apparent from the examples, the inventive mixtures of polyisocyanates, polyepoxides, and catalyst display outstanding mechanical properties. Furthermore, depending on the equivalents ratio of polyisocyanate to polyepoxide, the mechanical properties of the products can be improved further by storage under hot and humid conditions.

The invention claimed is:

1. A method for producing a resin, the method comprising:
   (i) mixing at least one polyisocyanate with at least one polyepoxide in the presence of a metal-free catalyst system comprising at least one of 1,8-diazabicyclo-5,4,0-undecen-7-ene and a blocked 1,8-diazabicyclo-5,4,0-undecen-7-ene;
   (ii) delivering the mixture (I) into a mold or to a desired reaction site by pouring, spraying, or distributing; and
   (iii) heating the mixture (I) to a temperature in a range of from 70 to less than 100° C. until the mixture is cured,
   wherein the content of the catalyst system is is from 0.001 to 1 wt%, based on the sum of the polyisocyanate and polysepoxide of the mixture,
   no hydrogen-acidic compounds are added in said mixing and
   the equivalent ratio of the at least one polyisocyanate to the at least one polyepoxide is from 7.5:1 to 5000:1.

2. The method according to claim 1, wherein the content of the catalyst system is from 0.005 to 0.75 wt %.

3. The method according to claim 2, wherein the mixture (I) has a gel time of more than 60 minutes at a temperature of 25° C.

4. The method according to claim 1, wherein the at least one polyepoxide is selected from the group consisting of epoxides of epichlorohydrin and at least one compound selected from the group consisting of hisphenol A, bisphenol F, bisphenol K, bisphenol S, biphenol, hydroquinone, resorcinol, tetrabromohisphenol A and a phenol-formaldehyde novolac resin, a polyglycidyl ether, a diglycidyl ester, an aliphatic di- or tri-epoxide, and a mixture of two or more thereof.

5. The method according to claim 1, wherein no isocyanate-reactive compounds other than epoxides are used in said mixing.

6. The method according claim 1, wherein the at least one polyisocyanate is selected from the group consisting of an aromatic polyisocyanate, an araliphatic polyisocyanate, and an aliphatic polyisocyanate.

7. The method according to claim 1, wherein the at least one polyisocyanate is a prepolymer having an NCO content of from 2% to 30%.

8. The method according to claim 1, wherein the equivalent ratio of the at least one polyisocyanate to the at least one polyepoxide is from 10:1 to 5000:1.

9. A resin, obtained by a method comprising:
   (i) mixing at least one polyisocyanate with at least one polyepoxide in the presence of a metal-free catalyst system comprising at least one of 1,8-diazabicyclo-5,4,0-undecen-7-ene and a blocked 1,8-diazabicyclo-5,4,0-undecen-7-ene;
   (ii) delivering the mixture (I) into a mold or to a desired reaction site by pouring, spraying, or distributing; and
   (iii) heating the mixture (I) to a temperature in a range from 70 to less than 100° C. until the mixture is cured,
   wherein the content of the catalyst system is is from 0.001 to 1 wt %, based on the sum of the polyisocyanate and polyepoxide of the mixture, and
   the equivalent ratio of the at least one polyisocyanate to the at least one polyepoxide is from 7.5:1 to 5000:1.

10. The resin according to claim 9, wherein the content of the catalyst system is from 0.005 to 0.75 wt %.

11. The resin according to claim 9, wherein the at least one polyepoxide is selected from the group consisting of epoxides of epichlorohydrin and at least one compound selected from the group consisting of bisphenol A, bisphenol F, bisphenol K, bisphenol S, biphenol, hydroquinone, resorcinol, tetrabromobisphenol A and a phenol-formaldehyde novolac resin, a polyglycidyl ether, a diglycidyl ester, an aliphatic di-or tri-epoxide, and a mixture of two or more thereof.

12. The resin according to claim 9, wherein the at least one polyisocyanate is selected from the group consisting of an aromatic polyisocyanate, an araliphatic polyisocyanate, and an aliphatic polyisocyanate.

13. A process for producing an article, the process comprising:
   preparing a resin by the method according to claim 1, and preparing the article with the resin;
   wherein the article is a seal, a component for a rotor blade, a boat hull, a vehicle body part, or a coating.

14. An article, comprising:
   the resin according to claim 9,
   wherein the article is a seal, a component for a rotor blade, a boat hull, a vehicle body part, or a coating.

* * * * *

UNITED STATES PATENT AND TRADEMARK OFFICE
CERTIFICATE OF CORRECTION

| | | |
|---|---|---|
| PATENT NO. | : 10,329,370 B2 | Page 1 of 1 |
| APPLICATION NO. | : 14/890847 | |
| DATED | : June 25, 2019 | |
| INVENTOR(S) | : Frank Prissok et al. | |

It is certified that error appears in the above-identified patent and that said Letters Patent is hereby corrected as shown below:

In the Specification

In Column 4, Line 26, delete "diazacyclo" and insert -- diazabicyclo --, therefor.

In Column 4, Line 27, delete "diazacyclo" and insert -- diazabicyclo --, therefor.

In Column 4, Line 29, delete "diazacyclo" and insert -- diazabicyclo --, therefor.

In the Claims

In Column 13, Line 33, Claim 1, delete "is is" and insert -- is --, therefor.

In Column 13, Line 35, Claim 1, delete "polysepoxide" and insert -- polyepoxide --, therefor.

In Column 13, Line 48, Claim 4, delete "hisphenol" and insert -- bisphenol --, therefor.

In Column 13, Line 50, Claim 4, delete "tetrabromohisphenol" and insert
-- tetrabromobisphenol --, therefor.

In Column 14, Line 4, Claim 6, after "according" insert -- to --.

In Column 14, Line 23, Claim 9, delete "is is" and insert -- is --, therefor.

Signed and Sealed this
Twenty-fourth Day of December, 2019

Andrei Iancu
*Director of the United States Patent and Trademark Office*